US006984707B2

(12) United States Patent
Ziche et al.

(10) Patent No.: US 6,984,707 B2
(45) Date of Patent: Jan. 10, 2006

(54) CROSSLINKABLE COMPOUNDS ON THE BASIS OF ORGANOSILICON COMPOUNDS

(75) Inventors: Wolfgang Ziche, Diera (DE); Uwe Scheim, Coswig (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 10/476,827

(22) PCT Filed: Aug. 14, 2002

(86) PCT No.: PCT/EP02/09143

§ 371 (c)(1), (2), (4) Date: Nov. 3, 2003

(87) PCT Pub. No.: WO03/018691

PCT Pub. Date: Mar. 6, 2003

(65) Prior Publication Data

US 2004/0122198 A1 Jun. 24, 2004

(30) Foreign Application Priority Data

Aug. 23, 2001 (DE) ................................ 101 41 237

(51) Int. Cl.
*C08L 77/08* (2006.01)

(52) U.S. Cl. ...................... 528/18; 528/901; 528/38; 528/34; 524/588

(58) Field of Classification Search ................ 528/901, 528/18, 38, 34; 524/588
See application file for complete search history.

(56) References Cited

U.S. PATENT DOCUMENTS

| 3,095,434 A | 6/1963 | Stamm et al. |
| 5,073,586 A | 12/1991 | Berthet et al. |
| 5,118,738 A | 6/1992 | Berthet et al. |
| 5,124,417 A | 6/1992 | Farooq |
| 5,425,947 A | 6/1995 | Hautekeer et al. |
| 5,849,864 A | 12/1998 | Carlson et al. |
| 5,981,685 A | 11/1999 | Seshadri et al. |

FOREIGN PATENT DOCUMENTS

| DE | 26 09 150 | | 9/1976 |
| DE | 195 27 101 | A1 | 12/1996 |
| DE | 199 24 101 | A1 | 11/2000 |
| EP | 0 623 642 | A2 | 11/1994 |
| EP | 1 108 752 | A1 | 6/2001 |
| WO | WO 99/11369 | | 3/1999 |

OTHER PUBLICATIONS

English Derwent Abstract corres. to EP 1 108 752 [AN 2001-504091 [56]].
English Derwent Abstract corres. to DE 26 09150 [AN 1976-76099X [41]].
English Derwent Abstract corres. to EP 199 24 101 [2001-093652 [11]].
English Derwent Abstract corres. to DE 195 27 101 [AN 1997-035970 [04]].
English Derwent Abstract corres. to EP 0 623 642 [AN 1995-343288 [43]].
F. Thunecke, R. Borsdorf, F. Prakt. Chemm. 333 (1991), pp. 489-494.
A.G. Davies Organotin Chemistry, VCH Verlagsgesellschaft, Weinheim 1997, Chapter 11.4.
High Molecular report of 1977.

*Primary Examiner*—Kuo-Liang Peng
(74) *Attorney, Agent, or Firm*—Brooks Kushman P.C.

(57) ABSTRACT

One component vulcanizable silicone elastomer compositions contain at least one organosilicon compound bearing a plurality of hydrolyzable groups, optionally one or more crosslinkers bearing hydrolyzable groups, and a catalyst system comprising a tin compound bearing a sulphonic acid, sulfonic acid amide, or sulfonic acid ester group, and a basic nitrogen compound. Storage stable compositions capable of vulcanizing to clear or translucent moldings are produced.

14 Claims, No Drawings

CROSSLINKABLE COMPOUNDS ON THE BASIS OF ORGANOSILICON COMPOUNDS

The invention relates in particular to materials vulcanizable at room temperature and based on organosilicon compounds, e.g. so-called RTV-1 materials, using special tin catalysts, and a process for the preparation of such materials.

The use of dialkyltin (IV) compounds as condensation catalysts in RTV-1 and RTV-2 silicon rubbers is generally known. In RTV-1 alkoxy materials, however, these tin compounds have the disadvantage that you also catalyze the undesired cleavage of the siloxane chains by alcohol radicals ("equilibration"), vulcanizable terminal alkoxy groups of the polysiloxane chain no longer being formed and hence sufficient vulcanization of the material no longer being possible; i.e. with use in the intended manner, no stable vulcanized products or no sufficiently stable vulcanized products being obtained. The shelf life, stated as a period in which the RTV-1 material can be stored without markedly reducing its properties, is dramatically reduced by the equilibration.

The methods of choice for extending the shelf life consist to date in replacement of the tin catalyst by a titanium catalyst. The disadvantage here is the yellow coloration of the materials, with the result that only opaque, but not translucent, materials are possible.

Reduction of the amount of the tin catalyst.

Use of less aggressive tin catalysts, for example tin-chelate catalysts. An excess of chelate compound, such as, for example, acetylacetonate, is necessary; however, this is volatile, toxicologically unacceptable and hazardous to health.

Addition of alcohol scavengers which, owing to their high reactivity, react with alcohols. This addition is, however, expensive and in general has an adverse effect on the adhesion behavior.

Dialkyldiacyltin catalysts blocked with sulfonic acid are known for polyurethanes, activation being effected via amines. In this context, reference may be made, for example, to U.S. Pat. No. 5,849,864 or WO99/11369, Ashland Chemical Company.

Organotin-based RTV-2 curing agents (catalyst/crosslinking agent compositions) are described in DE-A 195 27 101 and may also contain organic acids as reaction time regulators, the reaction time regulators being intended to improve the reactivity of the claimed catalyst/crosslinking agent compositions.

The use of Sn—O—SO$_2$R-containing compounds, which can be prepared, for example, from alkyltin oxides and sulfonic acids, in, inter alia, condensation-vulcanizing polymer systems has been described. In this context, reference may be made, for example, to U.S. Pat. No. 3,095,434 and U.S. Pat. No. 5,981,685. Not described in the examples is the use of the claimed catalysts with Sn sulfonate units for RTV silicone systems. However, alkoxy-RTV-1 systems with their specific problems with regard to the shelf life and the necessity of cocatalyzing additives are not described.

EP-A 623 642 describes the addition of acids, including sulfonic acids, for stabilizing RTV-1 acetoxy materials if the polymers contained have been prepared by anionic polymerization of cyclic compounds and, for example, phosphoric acid was used for neutralizing the basic polymerization catalysts and the materials thus contain, for example, alkali metal phosphates.

The use of reaction products of sulfonic acids with amines or basic fillers in filled RTV systems is known, in order to facilitate the dispersing of the fillers and to obtain an elastomer having a low modulus. In this context, reference may be made, for example, to U.S. Pat. No. 5,073,586 and U.S. Pat. No. 5,118,738.

Finally, U.S. Pat. No. 5,425,947 states that RTV materials which contain carboxylic anhydride-containing polymers as rheological additives may contain sulfonic acids as a further modulus-reducing additive.

The invention relates to vulcanizable materials based on organosilicon compounds with at least two hydrolyzable groups, characterized in that at least one organotin compound (c) containing units of the formula

$$R_a R^1{}_b (XR^3)_c SnX_{(4-a-b-c)/2} \qquad (I)$$

and compounds (D) containing basic nitrogen are contained as a catalyst, where

R may be identical or different and is a monovalent, optionally substituted hydrocarbon radical which can be interrupted by oxygen atoms, X may be identical or different and is —O— or —S—, R$^1$ may be identical or different and has the meaning of —OS(=O)$_2$R$^2$, R$^2$ may be identical or different and is an amine radical bonded via nitrogen, a monovalent, optionally substituted hydrocarbon radical which may be interrupted by —S(=O)$_2$—, or a radical —OR$^4$ with R$^4$ having the meaning stated for R$^3$, R$^3$ may be identical or different and is a hydrogen atom or a monovalent, optionally substituted hydrocarbon radical which may be interrupted by oxygen atoms, a is 0, 1, 2 or 3, b is 0, 1, 2 or 3, c is 0, 1, 2 or 3, with the proviso that the sum a+b+c is <4 and the organotin compound has at least one radical R$^1$.

The organotin compounds used according to the invention may be both stannanes, i.e. compounds of the formula (I) with a+b+c=4, and oligomeric or polymeric tin compounds, such as, for example, stannoxanes, i.e. compounds containing units of the formula (I) with a+b+c≦3. Preferably, the organotin compounds used according to the invention are those which consist of units of the formula (I).

Preferably, radical R is a hydrocarbon radical having 1 to 18 carbon atoms, particularly preferably an alkyl radical having 1 to 12 carbon atoms, in particular the n-butyl radical and the n-octyl radical.

Examples of radicals R are alkyl radicals, such as methyl, ethyl, n-propyl, isopropyl, 1-n-butyl, 2-n-butyl, isobutyl, tert-butyl, n-pentyl, isopentyl, neopentyl and tert-pentyl radicals; hexyl radicals, such as the n-hexyl radical; heptyl radicals, such as the n-heptyl radical; octyl radicals, such as the n-octyl radical and isooctyl radicals, such as the 2,2,4-trimethylpentyl radical; nonyl radicals, such as the n-nonyl radical; decyl radicals, such as the n-decyl radical; dodecyl radicals, such as the n-dodecyl radical; octadecyl radicals, such as the n-octadecyl radical; cycloalkyl radicals, such as the cyclopentyl, cyclohexyl and cycloheptyl radical and methylcyclohexyl radicals; alkenyl radicals, such as the vinyl, 1-propenyl and 2-propenyl radical; aryl radicals, such as the phenyl, naphthyl, anthryl and phenanthryl radical; alkaryl radicals, such as o-, m- and p-tolyl radicals; xylyl radicals and ethylphenyl radicals; and aralkyl radicals, such as the benzyl radical and the the α- and the β-phenylethyl radical.

Examples of substituted radicals R are methoxyethyl, ethoxyethyl and the ethoxyethoxyethyl radical.

X is preferably an oxygen atom.

Radical $R^2$ is preferably an optionally —$SO_3H$-substituted hydrocarbon radical having 1 to 40 carbon atoms, which may be interrupted by —S(=O)$_2$—, particularly preferably an alkyl or aryl radical having 1 to 40 carbon atoms, in particular an alkyl-substituted aryl radical having 7 to 40 carbon atoms.

Examples of radicals $R^2$ are the examples mentioned for R and —$NH_2$, —$C_6H_4$—$SO_3H$ and —$C_4H_8$—$SO_3H$.

Radical $R^3$ is preferably a hydrogen atom and a hydrocarbon radical optionally substituted by alkoxy radicals and/or amino radicals and having 1 to 18 carbon atoms, particularly preferably an alkyl or aryl radical having 1 to 18 carbon atoms, in particular the methyl and ethyl radical.

Examples of radicals $R^3$ are the examples mentioned for R and the methoxyethyl, ethoxyethyl, methoxyethoxyethyl, aminoethoxyethyl and aminopropyl radical.

The catalysts (C) used according to the invention are preferably stannanes of the formula (I) or linear stannoxanes comprising units of the formula (I).

Examples of catalysts (C) used according to the invention are Oct$_2$Sn(OEt)(OSO$_2$—C$_6$H$_4$—CH$_3$), Bu$_2$Sn(OSO$_2$—C$_6$H$_4$—CH$_3$)$_2$, Oct$_2$Sn(OCH$_3$)—SnOct$_2$(OSO$_2$—C$_6$H$_4$—C$_{12}$H$_{23}$) and [Bu$_2$Sn(OSO$_2$—C$_6$H$_4$—C$_{12}$H$_{23}$)]$_2$O, with Bu$_2$Sn(OSO$_2$—C$_6$H$_4$—CH$_3$)$_2$, Oct$_2$Sn(OCH$_3$)—O—SnOct$_2$(OSO$_2$—C$_6$H$_4$—C$_{12}$H$_{23}$) and [Bu$_2$Sn(OSO$_2$—C$_6$H$_4$—C$_{12}$H$_{23}$)]$_2$O being preferred and Oct$_2$Sn(OCH$_3$)—O—SnOct$_2$(OSO$_2$—C$_6$H$_4$—C$_{12}$H$_{23}$) and [Bu$_2$Sn(OSO$_2$—C$_6$H$_4$—C$_{12}$H$_{23}$)]$_2$O being particularly preferred, where Et is an ethyl radical, Bu is an n-butyl radical and Oct is an n-octyl radical.

The organotin compounds used according to the invention and containing units of the formula (I) are commercial products or can be prepared by processes known from organic chemistry, such as, for example, by reacting the corresponding organotin compounds with sulfonic acids or sulfonic acid derivatives. In this context, reference may be made, for example, to F. Thunecke, R. Borsdorf, *J. Prakt. Chem.*, 333(1991), 489–494, and A. G. Davies *Organotin Chemistry*, VCH Verlagsgesellschaft, Weinheim, 1997, Section 11.4.

The preparation of the catalysts (C) according to the invention is also possible in situ by direct addition of the starting materials to the other components of the vulcanizable materials, which is included in the disclosure of the present invention but is not preferred. If the catalysts (C) according to the invention are to be prepared in situ, it is preferable if basic components are added only after the in situ reaction of the tin compound and the sulfonic acid.

The compounds (D) containing basic nitrogen may be amines, nitrogen-containing heterocycles or amino-functional organosilicon compounds, the last-mentioned being preferred.

Examples of amino-functional organosilicon compounds (D) are silanes containing basic nitrogen, and organosiloxanes containing basic nitrogen, such as, for example, those of the formula (II) in which at least one radical $R^6$ is a hydrocarbon radical substituted by amino groups.

The organosilicon compounds (D) containing basic nitrogen are preferably those of the formula $$(R^9O)_{4-g}SiR^{10}{}_g \qquad (IV),$$

in which $R^9$ may be identical or different and has one of the meanings stated above for $R^3$, $R^{10}$ may be identical or different and is a monovalent, optionally substituted hydrocarbon radical containing basic nitrogen and g is 1, 2, 3 or 4, and the partial hydrolysis products thereof.

The partial hydrolysis products may be partial homohydrolysis products, i.e. partial hydrolysis products of a type of organosilicon compound of the formula (IV), as well as partial cohydrolysis products, i.e. partial hydrolysis products of at least two different types of organosilicon compounds of the formula (IV).

If the compound (D) used in the materials according to the invention are partial hydrolysis products of organosilicon compounds of the formula (IV), those having up to 6 silicon atoms are preferred.

Examples of radical $R^9$ are the examples mentioned above for radical $R^3$. Radical $R^9$ is preferably a hydrogen atom or an alkyl radical, particularly preferably a hydrogen atom- or an alkyl radical having 1 to 4 carbon atoms, in particular a hydrogen atom or the methyl or ethyl radical.

Examples of radicals $R^{10}$ are the aminomethyl, 1-aminoethyl, 3-aminopropyl, 3-(2-aminoethyl)aminopropyl, aminoethylaminoethylaminopropyl and cyclohexylaminopropyl radical.

Radical $R^{10}$ is preferably the 3-aminopropyl, 3-(2-aminoethyl)aminopropyl, aminoethylaminoethylaminopropyl or cyclohexylaminopropyl radical, the 3-aminopropyl and 3-(2-aminoethyl)aminopropyl radical being particularly preferred.

Examples of compounds (D) used according to the invention and containing basic nitrogen are 3-aminopropyltrimethoxysilane, 3-aminopropyltriethoxysilane, 3-(2-aminoethylamino)propyltrimethoxysilane, 3-(2-aminoethylamino)propyltriethoxysilane, 3-(N,N-diethyl-2-aminoethylamino)propyltrimethoxysilane, 3-(N,N-diethyl-2-aminoethylamino)propyltriethoxysilane, 3-(cyclohexylamino)propyltrimethoxysilane, 3-(cyclohexylamino)propyltriethoxysilane, aminomethyltrimethoxysilane and partial hydrolysis products of said alkoxy-functional organosilicon compounds.

The compounds (D) used according to the invention are commercial products which can be prepared by processes known in organic chemistry.

In addition to the tin compounds (C) used according to the invention as condensation catalysts and compounds (D) containing basic nitrogen, the materials according to the invention may contain all components which have also been used to date for the preparation of organopolysiloxane materials vulcanizable at room temperature. The hydrolyzable groups which the organosilicon compounds used and involved in the vulcanization reaction can have may be any desired groups, such as acetoxy, oximato and organyloxy groups, in particular alkoxy radicals, such as ethoxy radicals, alkoxyethoxy radicals and methoxy radicals. Furthermore, the organosilicon compounds may be both siloxanes (=Si—O—Si= structures) and silcarbanes (=Si—R'—Si= structures where R' is a divalent hydrocarbon radical which is optionally substituted or is interrupted by hetero atoms) or the copolymers thereof.

The vulcanizable materials according to the invention are preferably those which contain (A) organopolysiloxanes having at least two hydrolyzable radicals selected from acetoxy, oximato and organyloxy groups, optionally (B) crosslinking agent having at least three hydrolyzable radicals selected from acetoxy, oximato and organyloxy groups, and/or the partial hydrolysis products thereof,
(C) organotin compound containing units of the formula (I) and
(D) compounds (D) containing basic nitrogen.

The organopolysiloxanes used according to the invention and having at least two hydrolyzable groups (A) are preferably those of the general formula

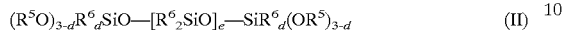
(II)

in which
d is 0, 1 or 2,
$R^6$ are identical or different SiC-bonded hydrocarbon radicals having 1 to 18 carbon atoms, which are optionally substituted by halogen atoms, ether groups, ester groups, epoxy groups, mercapto groups, cyano groups, amino groups or (poly)glycol radicals, the last-mentioned being composed of oxyethylene and/or oxypropylene units, and
$R^5$ may be identical or different and has the meaning stated for $R^3$,
e is an integer from 10 to 10 000, preferably from 100 to 3 000, particularly preferably from 400 to 2 000,
with the proviso that d may have the value 2 only when $R^5$ is a hydrogen atom.

Examples of radicals $R^6$ are the examples stated above for radical R.

Radical $R^6$ is preferably an alkyl radical, particularly preferably an alky radical having 1 to 4 carbon atoms, in particular the methyl radical.

Examples of radicals $R^5$ are the examples stated above for radical $R^3$.

Radical $R^5$ is preferably a hydrogen atom or an alkyl radical, particularly preferably a hydrogen atom or an alkyl radical having 1 to 4 carbon atoms, in particular a hydrogen atom or the methyl or ethyl radical.

The average value of the number e in formula (II) is preferably chosen so that the organopolysiloxane of the formula (II) has a viscosity of from 1 000 to 2 500 000 mPa·s, particularly preferably from 4 000 to 800 000 mPa·s, measured in each case at a temperature of 25° C.

Although not shown in formula (II) and not evident from the designation diorganopolysiloxane, up to 10 mole percent of the diorganosiloxane units can be replaced by other siloxane units, such as $R^6{}_3SiO_{1/2}$, $R^6SiO_{3/2}$ and $SiO_{4/2}$ units, $R^6$ having the meaning stated above therefor.

Examples of the organopolysiloxanes used in the materials according to the invention and having at least two organyloxy radicals on each terminal group (A) are
$(MeO)_2MeSiO[SiMe_2O]_{200-2000}SiMe(OMe)_2$,
$(EtO)_2MeSiO[SiMe_2O]_{200-2000}SiMe(OEt)_2$,
$(MeO)_2ViSiO[SiMe_2O]_{200-2000}SiVi(OMe)_2$ and
$(EtO)_2ViSiO[SiMe_2O]_{200-2000}SiVi(OEt)_2$,
Me being a methyl radical, Et being an ethyl radical and Vi being a vinyl radical.

The organosilicon compounds used in the materials according to the invention and having at least two hydrolyzable groups (A) are commercial products or can be prepared by processes known in silicon chemistry, for example by reacting α,ω-dihydroxypolyorganosiloxanes with the corresponding organyloxysilanes.

The crosslinking agents (B) optionally used in the materials according to the invention may be any desired, previously known crosslinking agent having at least three hydrolyzable radicals, such as, for example, silanes or siloxanes having at least three organyloxy groups.

The crosslinking agents (B) optionally used in the materials according to the invention are preferably organosilicon compounds of the formula

(III), in which
$R^7$ may be identical or different and has one of the meanings stated above for $R^3$,
$R^8$ has a meaning stated above for R and
f is 0 or 1,
and the partial hydrolysis products thereof.

The partial hydrolysis products may be partial homohydrolysis products, i.e. partial hydrolysis products of a type of organosilicon compound of the formula (III), as well as partial cohydrolysis products, i.e. partial hydrolysis products of at least two different types of organosilicon compounds of the formula (III).

If the crosslinking agents (B) optionally used in the materials according to the invention are partial hydrolysis products of organosilicon compounds of the formula (III), those having up to 6 silicon atoms are preferred.

Examples of radical $R^7$ are the examples stated above for radical $R^3$. Radical $R^7$ is preferably a hydrogen atom or an alkyl radical, particularly preferably a hydrogen atom or an alkyl radical having 1 to 4 carbon atoms, in particular a hydrogen atom or the methyl or ethyl radical.

Examples of radical $R^8$ are the examples stated above for radical R, hydrocarbon radicals having 1 to 12 carbon atoms being preferred and the methyl and the vinyl radical being particularly preferred.

The crosslinking agents (B) optionally used in the materials according to the invention are particularly preferably tetramethoxysilane, tetraethoxysilane, tetrapropoxysilane, tetrabutoxysilane, methyltrimethoxysilane, methyltriethoxysilane, vinyltrimethoxysilane, vinyltriethoxysilane, phenyltrimethoxysilane, phenyltriethoxysilane, 3-cyanopropyltrimethoxysilane, 3-cyanopropyltriethoxysilane, 3-(glycidyloxy)propyltriethoxysilane, 1,2-bis(trimethoxysilyl)ethane, 1,2-bis(triethoxysilyl)ethane and partial hydrolysis products of said alkoxy-functional organosilicon compounds, such as, for example, hexaethoxydisiloxane.

The crosslinking agents (B) optionally used in the materials according to the invention are commercial products or can be prepared by processes known in silicon chemistry.

If the materials according to the invention contain crosslinking agents (B), the amounts are preferably from 0.01 to 20 parts by weight, particularly preferably from 0.5 to 10 parts by weight, in particular from 1.0 to 5.0 parts by weight, based in each case on 100 parts by weight of organopolysiloxane (A). Inter alia, the addition of crosslinking agent (B) can be dispensed with or the amount reduced if, for example, compounds having at least three hydrolyzable groups are used as component (D).

The materials according to the invention contain catalyst (C) in amounts of, preferably, from 0.001 to 5 percent by weight, particularly preferably from 0.05 to 3 percent by weight, in particular from 0.1 to 1 percent by weight, based in each case on 100 parts by weight of organopolysiloxane (A).

The materials according to the invention contain component (D) in amounts of, preferably, from 0.001 to 6 percent by weight, particularly preferably from 0.5 to 4 percent by weight, in particular from 1 to 3 percent by weight, based in each case on 100 parts by weight of organopolysiloxane (A).

In addition to the components (A), (B), (C) and (D) described above, the materials according to the invention may contain further substances, such as plasticizers (E), fillers (F), adhesion promoters (G) and additives (H), it being possible for the additional substances (E) to (H) to be the same as those which have also been used previously in materials storable in the absence of moisture and vulcanizable on admission of moisture.

Examples of plasticizers (E) are dimethylpolysiloxanes which are liquid at room temperature and endcapped by trimethylsilyloxy groups, in particular having viscosities in the range between 50 and 1 000 mPa·s, and high-boiling hydrocarbons, such as, for example, liquid paraffins.

The materials according to the invention contain plasticizers (E) in amounts of, preferably, from 0 to 300 parts by weight, particularly preferably from 10 to 200 parts by weight, in particular from 20 to 100 parts by weight, based in each case on 100 parts by weight of organopolysiloxane (A).

Examples of fillers (F) are nonreinforcing fillers, i.e. fillers having a BET surface area of up to 50 m²/g, such as quartz, diatomaceous earth, calcium silicate, zirconium silicate, zeolites, metal oxide powders, such as aluminum, titanium, iron or zinc oxides or the mixed oxides thereof, barium sulfate, calcium carbonate, gypsum, silicon nitride, silicon carbide, boron nitride, glass powder and plastics powder, such as polyacrylonitrile powder; reinforcing fillers, i.e. fillers having a BET surface area of more than 50 m²/g, such as silica prepared by a pyrogenic method, precipitated silica, precipitated chalk, carbon black, such as furnace black and acetylene black, and silicon/aluminum mixed oxides having a large BET surface area; fibrous fillers, such as asbestos and plastics fibers. Said fillers may have been rendered hydrophobic, for example by treatment with organosilanes or organosiloxanes or with stearic acid or by etherification of hydroxyl groups to give alkoxy groups. If fillers (E) are used, they are preferably hydrophilic pyrogenic silica and stearic acid-coated chalk.

The materials according to the invention contain fillers (F) in amounts of, preferably, from 0 to 300 parts by weight, particularly preferably from 1 to 200 parts by weight, in particular from 5 to 200 parts by weight, based in each case on 100 parts by weight of organopolysiloxane (A).

Examples of the adhesion promoters (G) used in the materials according to the invention are silanes and organopolysiloxanes having functional groups, such as, for example, those having glycidyloxypropyl or methacryloyloxypropyl radicals, and tetraalkoxysilanes. If, however, another component, such as, for example, siloxane (A) or crosslinking agent (B), already has said functional groups, the addition of adhesion promoter can be dispensed with.

The materials according to the invention contain adhesion promoters (G) in amounts of, preferably, from 0 to 50 parts by weight, particularly preferably from 1 to 20 parts by weight, in particular from 1 to 10 parts by weight, based in each case on 100 parts by weight of organopolysiloxane (A).

Examples of additives (H) are pigments, dyes, fragrances, fungicides, antioxidants, agents for influencing the electrical properties, such as conductive carbon black, flame retardant agents, light stabilizers and agents for prolonging the skin formation time, such as silanes having an SiC-bonded mercaptoalkyl radical, cell-producing agents, e.g. azodicarboxamide, heat stabilizers and thixotropic agents, such as, for example, phosphoric esters, and organic solvents, such as alkylaromatics.

The materials according to the invention contain additives (H) in amounts of, preferably, from 0 to 100 parts by weight, particularly preferably from 0 to 30 parts by weight, in particular from 0 to 10 parts by weight, based in each case on 100 parts by weight of organopolysiloxane (A).

The materials according to the invention are particularly preferably those which contain
(A) diorganopolysiloxane of the formula (II), optionally
(B) crosslinking agent of the formula (III) and/or partial hydrolysis products thereof,
(C) organotin compound containing units of the formula (I) and
(D) compound of the formula (IV) containing basic nitrogen.

In particular, the materials according to the invention are those which consist of
(A) 100 parts by weight of polydiorganosiloxane of the formula (II),
(B) from 0.01 to 20 parts by weight of crosslinking agent of the formula (III) and/or partial hydrolysis products thereof,
(C) from 0.05 to 3 parts by weight of organotin compound containing units of the formula (I),
(D) from 0.01 to 4 parts by weight of compound of the formula (IV) containing basic nitrogen,
(E) from 0 to 300 parts by weight of plasticizer,
(F) from 0 to 300 parts by weight of fillers,
(G) from 0 to 50 parts by weight of adhesion promoter and
(H) from 0 to 100 parts by weight of additives.

The individual components of the materials according to the invention may each be one type of such a component as well as a mixture of at least two different types of such components.

For the preparation of the materials according to the invention, all components of the respective material may be mixed with one another in any desired sequence. This mixing can be effected at room temperature and ambient pressure, i.e. from about 900 to 1 100 hPa. If desired, this mixing can, however, also be effected at higher temperatures, for example at temperatures in the range from 35° C. to 135° C.

The preparation of the materials according to the invention and the storage thereof must be effected under substantially anhydrous conditions, since otherwise the materials may cure prematurely.

The customary water content of the air is sufficient for the vulcanization of the materials according to the invention to give elastomers. The vulcanization can, if desired, also be carried out at temperatures higher or lower than room temperature, e.g. at from −5° to 15° C. or at from 30° to 50° C. Preferably, the vulcanization is carried out at a pressure of from 100 to 1 100 hPa, in particular at ambient pressure.

The present invention furthermore relates to moldings produced by vulcanization of the materials according to the invention.

The vulcanizable materials according to the invention have the advantage that they are distinguished by a very long shelf life and a high vulcanization rate.

Furthermore, the materials according to the invention have the advantage that, through the use of the organotin compounds of the formula (I), colorless, translucent materials are obtained.

The materials according to the invention can be employed for all intended uses for which materials storable in the absence of water and vulcanizing on admission of water at room temperature to give elastomers can be employed.

The materials according to the invention are thus outstandingly suitable, for example, as sealing compounds for joints, including perpendicular joints, and similar empty spaces having an internal dimension of, for example, from 10 to 40 mm, for example of buildings, land, water and air vehicles, or as adhesives or cementing materials, for example in window construction or in the production of aquaria or display cabinets and, for example, for the production of protective coatings, including those for surfaces exposed to the continuous action of fresh or sea water, or coatings which prevent sliding, or of elastomeric moldings and for the insulation of electrical or electronic apparatuses.

In the examples described below, all viscosity data are based on a temperature of 25° C. Unless' stated otherwise, the examples below are carried out at ambient pressure, i.e. at about 1 000 hPa, and at room temperature, i.e. at about 23° C., or at a temperature which results on combination of the reactants at room temperature without additional heating or cooling, and at a relative humidity of about 50%. Furthermore, all stated parts and percentages are based on weight, unless stated otherwise.

The shelf life of the RTV-1 alkoxy compounds prepared in the examples below is determined as a function of the storage time on the basis of their vulcanization to resilient rubbers. The aging of the compounds is accelerated by storage at 50° C. or 100° C.

EXAMPLE 1

Preparation of Tin Catalyst 1

16 g of dodecylbenzenesulfonic acid are added to 40 g of tetra-n-butyldimethoxydistannoxane, the methanol formed being removed in vacuo. A viscous, clear compound is obtained. The $^{119}$Sn-NMR spectrum shows only one signal high field-shifted to –420 ppm and hence complete conversion.

In a planetary mixer having vacuum equipment, 55.4 parts by weight of a polydimethylsiloxane having —OSi(OCH$_3$)$_2$ (CH$_3$) terminal groups, which has a viscosity of 80 000 mPa·s, are mixed with 31.2 parts by weight of a polydimethylsiloxane having —OSi(CH$_3$)$_3$ terminal groups and a viscosity of 100 mPa·s and 4.0 parts by weight of methyltrimethoxysilane and 1.5 parts by weight of 3-aminopropyltrimethoxysilane in the absence of water. Thereafter, 8.0 parts by weight of pyrogenic silica having a BET surface area of 150 m$^2$/g (commercially available from Wacker-Chemie GmbH under the trade name "WACKER HDK® V15") are mixed in and finally 0.2 part by weight of the tin catalyst 1 described above is added. After homogenization in vacuo, the compound thus obtained is filled into moisture-tight containers and left to vulcanize after the storage time stated in table 1. For this purpose, the compound thus obtained is applied in a 2 mm thick layer to a PE film and left to stand at 23° C. and 50% relative humidity. The vulcanization is assessed as being good if the material has completely vulcanized after 24 hours.

The results relating to the vulcanization behavior are shown in table 1.

EXAMPLE 2

Preparation of Tin Catalyst 2

Di-n-butyltin oxide is refluxed in toluene with 2 mole equivalents of p-toluenesulfonic acid monohydrate and the water of reaction is removed azeotropically. A colorless powder is obtained.

The procedure as described in example 1 is carried out with 0.2 part by weight of the tin catalyst 2 thus obtained. The results relating to the vulcanization behavior are shown in table 1.

EXAMPLE 3

Preparation of Tin Catalyst 3

Di-n-butyltin oxide is refluxed in water/methanol (1/1 v/v) with 2 mole equivalents of dodecylbenzenesulfonic acid and the water of reaction is removed azeotropically with toluene. A colorless powder is obtained.

The procedure as described in example 1 is carried out with 0.2 part by weight of the tin catalyst 3 thus obtained.

The results relating to the vulcanization behavior are shown in table 1.

EXAMPLE 4

Preparation of Tin Catalyst 4

4.8 g of amidosulfonic acid are added to 40 g of tetra-n-butyldimethoxydistannoxane. A colorless, clear liquid is obtained.

The procedure as described in example 1 is carried out with 0.2 part by weight of the tin catalyst 4 thus obtained.

The results relating to the vulcanization behavior are shown in table 1.

COMPARATIVE EXAMPLE 1

Preparation of Comparative Component 1

9.5 g of p-toluenesulfonic acid are mixed with 11 g of aminoethylaminopropyltrimethoxysilane, the mixture warming up to a considerable extent. 40 g of tetra-n-butyldimethoxydistannoxane are then added. The solid obtained dissolves in chloroform. The $^{119}$Sn-NMR spectrum shows signals for tetrabutyldimethoxydistannoxane at –174 and –188 ppm.

The procedure as described in example 1 is carried out with 0.2 part by weight of the comparative component 1 thus obtained.

The results relating to the vulcanization behavior are shown in table 1.

COMPARATIVE EXAMPLE 2

In a planetary mixer having vacuum equipment, 55.4 parts by weight of a polydimethylsiloxane having —OSi(OCH$_3$)$_2$ (CH$_3$) terminal groups, which has a viscosity of 80 000 mPa·s, are mixed with 31.2 parts by weight of a polydimethylsiloxane having —OSi(CH$_3$)$_3$ terminal groups and a viscosity of 100 mPa·s and 4.0 parts by weight of methyltrimethoxysilane and 1.5 parts by weight of 3-aminopropyltrimethoxysilane in the absence of water. Thereafter, 8.0 parts by weight of pyrogenic silica having a BET surface area of 150 m$^2$/g (commercially available from Wacker-Chemie GmbH under the trade name "WACKER HDK® V15") are mixed in and finally 0.4 part by weight of a tin catalyst (comparative component 2), which was prepared by reacting 4 parts of tetraethoxysilane with 2.2 parts of dibutyltin diacetate, is added. After homogenization in vacuo, the compound thus obtained is filled into moisture-tight containers and left to vulcanize after the storage time stated in table 1, as described in example 1.

The results relating to the vulcanization behavior are shown in table 1.

EXAMPLE 5

In a planetary mixer having vacuum equipment, 55.4 parts by weight of a polydimethylsiloxane having —OSi(OCH$_3$)$_2$(CH$_3$) terminal groups, which has a viscosity of 80 000 mPa·s, are mixed with 31.2 parts by weight of a polydimethylsiloxane having —OSi(CH$_3$)$_3$ terminal groups and a viscosity of 100 mPa·s and 4.0 parts by weight of methyltrimethoxysilane and 0.2 part by weight of tetra-n-butyldimethoxydistannoxane and 0.2 part by weight of dodecylbenzenesulfonic acid in the absence of water and the mixture is stirred for 10 minutes. Thereafter, 8.0 parts by weight of pyrogenic silica having a BET surface area of 150 m$^2$/g (commercially available from Wacker-Chemie GmbH under the trade name "WACKER HDK® V15") are mixed in and finally 1.5 parts by weight of 3-aminopropyltrimethoxysilane are added. After homogenization in vacuo, the compound thus obtained is filled into moisture-tight containers and left to vulcanize after the storage time stated in table 1, as described in example 1.

The results relating to the vulcanization behavior are shown in table 1.

COMPARATIVE EXAMPLE 3

In a planetary mixer having vacuum equipment, 55.4 parts by weight of a polydimethylsiloxane having —OSi(OCH$_3$)$_2$(CH$_3$) terminal groups, which has a viscosity of 80 000 mPa·s, are mixed with 31.2 parts by weight of a polydimethyl-siloxane having —OSi(CH$_3$)$_3$ terminal groups and a viscosity of 100 mPa·s and 4.0 parts by weight of methyltrimethoxysilane and 1.5 parts by weight of 3-aminopropyltrimethoxysilane in the absence of water. Thereafter, 8.0 parts by weight of pyrogenic silica having a BET surface area of 150 m$^2$/g (commercially available from Wacker-Chemie GmbH under the trade name "WACKER HDK® V15") are mixed in and finally 0.2 part by weight of tetra-n-butyldimethoxydistannoxane and 0.2 part by weight of dodecylbenzenesulfonic acid are added. After homogenization in vacuo, the compound thus obtained is filled into moisture-tight containers and left to vulcanize after the storage time stated in table 1, as described in example 1.

The results relating to the vulcanization behavior are shown in table 1.

COMPARATIVE EXAMPLE 4

In a planetary mixer having vacuum equipment, 55.4 parts by weight of a polydimethylsiloxane having —OSi(OCH$_3$)$_2$(CH$_3$) terminal groups, which has a viscosity of 80 000 mPa·s, are mixed with 31.2 parts by weight of a polydimethylsiloxane having —OSi(CH$_3$)$_3$ terminal groups and a viscosity of 100 mPa·s and 4.0 parts by weight of methyltrimethoxysilane and 0.2 part by weight of tetra-n-butyldimethoxydistannoxane and 0.2 part by weight of dodecylbenzenesulfonic acid in the absence of water and the mixture is stirred for 10 minutes. Thereafter, 8.0 parts by weight of pyrogenic silica having a BET surface area of 150 m$^2$/g (commercially available from Wacker-Chemie GmbH under the trade name "WACKER HDK® V15") are mixed in. After homogenization in vacuo, the compound thus obtained is filled into moisture-tight containers. The material thus obtained does not vulcanize.

TABLE 1

| Examples | Catalyst | Vulcanization after 1 day at 100° C. | Vulcanization after 2 weeks at 50° C. |
|---|---|---|---|
| Example 1 | Catalyst 1 | good | good |
| Example 2 | Catalyst 2 | good | good |
| Example 3 | Catalyst 3 | good | good |
| Example 4 | Catalyst 4 | good | good |
| Comparative example 1 | Comparative component 1 | none | none |
| Comparative example 2 | Comparative component 2 | none | none |
| Example 5 | Butylstannoxane/sulfonic acid | good | good |
| Comparative example 3 | Butylstannoxane/sulfonic acid | none | good |

What is claimed is:

1. A moisture-curable one part silicone elastomer composition, comprising:
   at least one organosilicon compound bearing at least two hydrolyzable groups; and
   a catalyst composition comprising at least one organotin compound containing units of the formula $$R_a R^1{}_b (XR^3)_c SnX_{(4-a-b-c)/2} \quad (I),$$ 

where
   R is a monovalent, optionally substituted hydrocarbon radical optionally interrupted by one or more non-adjacent oxygen atoms,
   X is —O— or —S—,
   R$^1$ is —OS(=O)$_2$R$^2$,
   R$^2$ is an amine radical bonded via nitrogen, a monovalent, optionally substituted hydrocarbon radical which may be interrupted by —S(=O)$_2$—, or a radical —OR$^4$ with R$^4$ having the meaning stated for R$^3$,
   R$^3$ is a hydrogen atom or a monovalent, optionally substituted hydrocarbon radical optionally interrupted by one or more non-adjacent oxygen atoms, wherein each R, X, R$^1$, R$^2$, R$^3$, and R$^4$ may be identical or different,
   a is 0, 1, 2 or 3,
   b is 0, 1, 2 or 3,
   c is 0, 1, 2 or 3,
   with the proviso that the sum a+b+c is <4 and the organotin compound has at least one radical R$^1$,
and
   at least one compound containing basic nitrogen, wherein one compound containing basic nitrogen is an aminofunctional organosilicon compound.

2. The composition of claim 1, wherein X is an oxygen atom.

3. The composition of claim 2, wherein at least one compound containing basic nitrogen is an organosilicon compound of the formula $$(R^9 O)_{4-g} SiR^{10}{}_g \quad (IV),$$ 

wherein
   R$^9$ is a hydrogen atom or a monovalent, optionally substituted hydrocarbon radical optionally interrupted by one or more non-adjacent oxygen atoms,
   R$^{10}$ is a monovalent, optionally substituted hydrocarbon radical containing basic nitrogen
wherein each R$^9$ and R$^{10}$ are identical or different, and
g is 1, 2, 3 or 4,
and the partial hydrolysis products thereof.

4. The composition of claim 1, wherein at least one compound containing basic nitrogen is an organosilicon compound of the formula $$(R^9O)_{4-g}SiR^{10}_g \quad (IV),$$

wherein
R$^9$ is a hydrogen atom or a monovalent, optionally substituted hydrocarbon radical optionally interrupted by one or more non-adjacent oxygen atoms,
R$^{10}$ is a monovalent, optionally substituted hydrocarbon radical containing basic nitrogen
wherein each R$^9$ and R$^{10}$ are identical or different, and
g is 1, 2, 3 or 4,
and the partial hydrolysis products thereof.

5. A molding produced by vulcanization of the composition of claim 4.

6. The composition of claim 1, comprising:
(A) at least one organopolysiloxane bearing at least two hydrolyzable radicals independently selected from the group consisting of acetoxy, oximato, and organyloxy groups;
(B) optionally, one or more crosslinking agents having at least three hydrolyzable radicals independently selected from the group consisting of acetoxy, oximato, and organyloxy groups, and the partial hydrolysis products thereof;
(C) at least one org anotin compound containing units of the formula (I); and
(D) at least one compound containing basic nitrogen, wherein one compound containing basic nitrogen is an amino-functional organosilicon compound.

7. A molding produced by vulcanization of the composition of claim 6.

8. A molding produced by vulcanization of the composition of claim 1.

9. The composition of claim 1, comprising:
(A) at least one diorganopolysiloxane of the formula (II), $$(R^5O)_{3-d}R^6_dSiO\text{—}[R^6_2SiO]_e\text{—}SiR^6_d(OR^5)_{3-d} \quad (II),$$

in which
d is 0, 1 or 2,
R$^6$ are identical or different SiC-bonded hydrocarbon radicals having 1 to 18 carbon atoms, optionally substituted by halogen atoms, ether groups, ester groups, epoxy groups, mercapto groups, cyano groups, amino groups or oxyethylene- or oxypropylene-containing (poly)glycol radicals,
R$^5$ are identical or different and have the meaning stated for R$^3$,
e is an integer from 10 to 10,000, with the proviso that d may have the value 2 only when R$^5$ is a hydrogen atom;

(B) optionally, one or more crosslinking agents of the formula (III)

$$(R^7O)_{4-f}SiR^8_f$$

in which
R$^7$ are identical or different and have one of the meanings stated for R$^3$,
R$^8$ has a meaning stated for R, and
f is 0 or 1,
and/or partial hydrolysis products thereof;
(C) at least one organotin compound containing units of the formula (I) and
(D) at least one compound which contains basic nitrogen of the formula (IV)

$$(R^9O)_{4-g}SiR^{10}_g \quad (IV),$$

wherein
R$^9$ is a hydrogen atom or a monovalent, optionally substituted hydrocarbon radical optionally interrupted by one or more non-adjacent oxygen atoms,
R$^{10}$ is a monovalent, optionally substituted hydrocarbon radical containing basic nitrogen
wherein each R$^9$ and R$^{10}$ are identical or different, and
g is 1, 2, 3 or 4,
and the partial hydrolysis products thereof.

10. The composition of claim 9 wherein e is an integer from 100 to 3,000.

11. A molding produced by vulcanization of the composition of claim 10.

12. The composition of claim 9 wherein e is an integer from 400 to 2,000.

13. The composition of claim 9, comprising:
(A) 100 parts by weight of polydiorganosiloxane(s) of the formula (II);
(B) from 0.01 to 20 parts by weight of crosslinking agent(s) of the formula (III) and/or partial hydrolysis products thereof;
(C) from 0.05 to 3 parts by weight of at least one organotin compound containing units of the formula (I);
(D) from 0.01 to 4 parts by weight of at least one compound of the formula (IV) which contains basic nitrogen;
(E) from 0 to 300 parts by weight of one or more plasticizer(s);
(F) from 0 to 300 parts by weight of one or more filler(s); and
(G) from 0 to 50 parts by weight of one or more adhesion promoter(s).

14. A molding produced by vulcanization of the composition of claim 9.

* * * * *

UNITED STATES PATENT AND TRADEMARK OFFICE
CERTIFICATE OF CORRECTION

| | | |
|---|---|---|
| PATENT NO. | : 6,984,707 B2 | Page 1 of 1 |
| APPLICATION NO. | : 10/476827 | |
| DATED | : January 10, 2006 | |
| INVENTOR(S) | : Wolfgang Ziche et al. | |

It is certified that error appears in the above-identified patent and that said Letters Patent is hereby corrected as shown below:

Column 13, Line 15, Claim 5:

Delete "4" and insert therefor -- 3 --.

Column 13, Line 27, Claim 6:

Delete "org anotin" and insert therefor -- organotin --.

Signed and Sealed this

Twenty-sixth Day of September, 2006

JON W. DUDAS
*Director of the United States Patent and Trademark Office*